US012286256B1

(12) United States Patent
Turgeman

(10) Patent No.: US 12,286,256 B1
(45) Date of Patent: Apr. 29, 2025

(54) METHOD FOR STORING OBJECTS BY BALLOON AND INSERTING TUBE

(71) Applicant: David Turgeman, Yavne (IL)

(72) Inventor: David Turgeman, Yavne (IL)

( * ) Notice: Subject to any disclaimer, the term of this patent is extended or adjusted under 35 U.S.C. 154(b) by 0 days.

(21) Appl. No.: 19/043,471

(22) Filed: Feb. 2, 2025

(30) Foreign Application Priority Data

Feb. 6, 2024 (IL) .......................................... 310686

(51) Int. Cl.
*B65B 5/04* (2006.01)
*B65B 31/04* (2006.01)
*B65F 1/00* (2006.01)
*A63H 27/10* (2006.01)

(52) U.S. Cl.
CPC ............ *B65B 5/045* (2013.01); *B65B 31/044* (2013.01); *B65B 31/048* (2013.01); *B65F 1/002* (2013.01); *A63H 2027/1016* (2013.01); *A63H 2027/1033* (2013.01); *A63H 2027/1091* (2013.01)

(58) Field of Classification Search
CPC ....... B65B 5/045; B65B 31/04; B65B 31/042; B65B 31/044; B65B 31/046; B65B 31/048; B65B 67/04; B65F 1/002; B65F 2210/188; A63H 2027/1016; A63H 2027/1033; A63H 2027/1091
USPC ..... 53/403, 408, 434, 79, 512; 446/220, 222
See application file for complete search history.

(56) References Cited

U.S. PATENT DOCUMENTS 3,807,130 A * 4/1974 Pedersen ............... B65B 25/065 53/512
4,736,281 A 4/1988 Neumeier
4,809,483 A * 3/1989 Lovik .................... A63H 27/10 53/434
4,809,484 A * 3/1989 Lovik .................... A63H 27/10 53/434
4,974,393 A * 12/1990 Rich et al. ............. A63H 27/10 53/434
5,098,329 A * 3/1992 Tseng ..................... A63H 27/10 446/221
5,279,340 A * 1/1994 Scherr et al. .......... A63H 27/10 53/434
5,538,456 A * 7/1996 Liu et al. ............... A63H 33/30 446/222

FOREIGN PATENT DOCUMENTS

DE 9317125 U1 * 4/1994 ..... A63H 2027/1091
GB 2434996 A * 8/2007 ..... A63H 2027/1091
WO WO2004/073820 A1 9/2004

* cited by examiner

*Primary Examiner* — Stephen F. Gerrity

(57) ABSTRACT

A method for storing objects in vacuum by inflatable balloon and inserting tube that includes a lid and a sleeve with inserting opening, drop opening, air inlet valve, and air outlet valve. The lid includes a sealing element that is compatible a sealing element on the inserting opening. The balloon includes an opening that is assembled on the sleeve such that the drop opening is positioning inside the balloon, and the opening of the balloon is assembled on the sleeve to prevent air to enter into the balloon through this opening. The user can open the lid, insert the object into the sleeve through the inserting opening, close and seal the inserting opening by the lid, inflate the balloon through the air inlet valve, slide the object into the inflated balloon, and to empty the air from the balloon through the air outlet valve.

3 Claims, 2 Drawing Sheets

METHOD FOR STORING OBJECTS BY BALLOON AND INSERTING TUBE

TECHNICAL FIELD

The present invention refers to a method and a device for storing objects that includes an inflatable balloon and an inserting tube.

BACKGROUND ART

There are many publications on bags including bags that can be inflated to contain objects, such as food, garbage or general objects, and which, using a tube and an air pump, suck the air from the contents to create a vacuum to reduce the volume of the bag full of objects. However, the present invention discloses a better solution.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
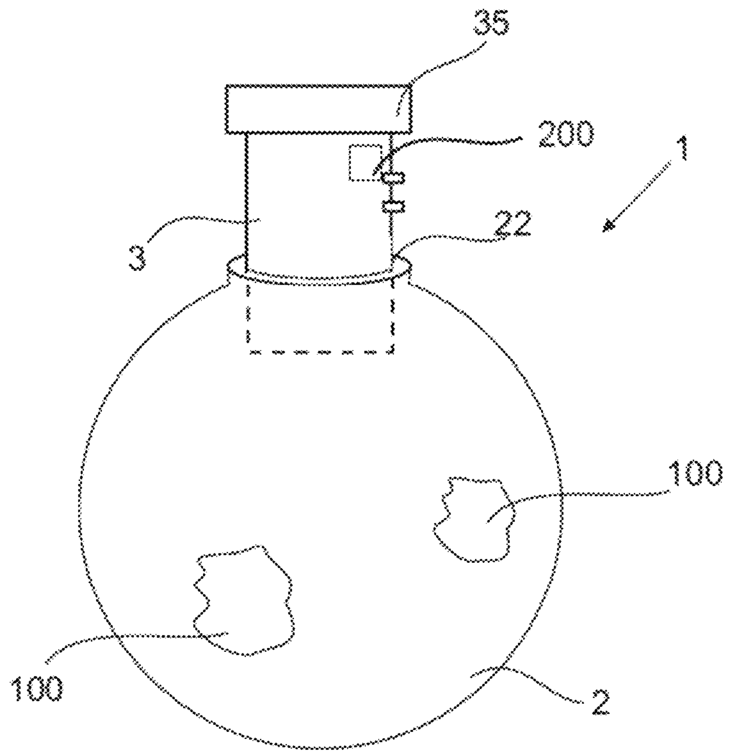
FIG. 1 schematically depicts the device (1).

The main object of the present invention is to provide a device (1) for storing food or for storing objects (100) or for garbage collection, in a vacuum. The device (1) comprises a balloon (2) and an inserting tube (3).

The balloon is designed to inflate when air is injected into the balloon at a pressure higher than the air pressure outside the balloon, and the balloon is designed to inflate to a volume size at least two times greater than the volume of the balloon when the balloon is empty and open to the air outside the balloon. The balloon should preferably be made from an elastic material that can stretch and allow the balloon to be inflated to the desired size.

The inserting tube (3) comprises a sleeve (36) and a lid (35). The sleeve includes an inserting opening (31), a drop opening (32), an air inlet valve (33), and an air outlet valve (34). The inserting tube may be made of plastic or polymeric materials. The valves can be ordinary air filling and air emptying valves, and it is possible for the device to include these two valves when they are combined together in the same hole and by the same means.

The lid is designed to close and seal the inserting opening of the sleeve. The lid includes a sealing element (351) and the inserting opening of the sleeve also includes a sealing element (311) that is compatible with the sealing element of the lid. The sealing elements can be, for example, threads, tightening by means of pressure and a peripheral rubber band, and the like, the similar means for closing, covering and sealing an opening of a tube.

The balloon includes an opening (21) that is designed to be assembled on the sleeve in such a way that the drop opening is positioning inside the balloon. The opening (21) of the balloon is designed to be assembled on the sleeve in a way that prevents air to enter into the balloon through the opening of the balloon.

The device is designed in such a way that a user can open the lid, to insert an object into the sleeve through the inserting opening, to close and seal the inserting opening by the lid, to inflate the balloon using an air pump (200) that is designed to be connected to the air inlet valve, to slide the object from the sleeve into the inflated balloon (for example by tilting the sleeve), and to empty the air from the balloon by releasing the air from the balloon or pumping the air from the balloon by the air pump through the air outlet valve. After pumping the air out of the balloon, the balloon clings to the objects inside (food, garbage, or objects in general), and allows storage in a limited space. In the case of food, the vacuum makes it possible to preserve the freshness of the food, and in the case of garbage, it makes it possible to prevent the emission of bad smells.

The balloon may include a tightening band (22) that is designed to fasten the opening of the balloon on the sleeve, and the sleeve may include a circumferential groove (37) that is designed to receive that tightening band when the balloon is assembled on the sleeve. This tightening band can be an integral part of the balloon (on the edge of the opening as standard balloons) or separately.

The present invention refers also to a method for storing food, garbage collection, or storing objects in a vacuum. The method includes one or more of the following steps: providing the inserting tube and the balloon, opening the lid, inserting the object into the sleeve through the inserting opening, closing and sealing the inserting opening by the lid, inflating the balloon using the air pump, sliding the object from the sleeve into the inflated balloon, and emptying the air from the balloon by releasing the air from the balloon or by pumping the air from the balloon by the air pump through the air outlet valve.

Figure 2:
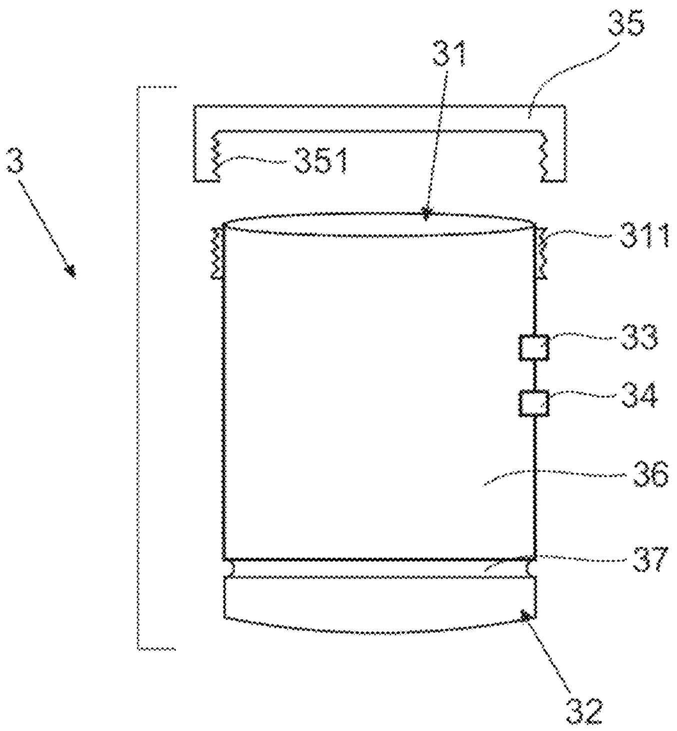
FIG. 2 schematically depicts the inserting tube (3).
Figure 3:
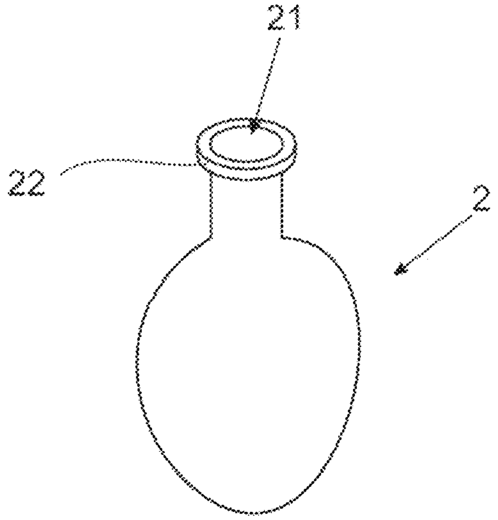
FIG. 3 schematically depicts the balloon (2).

FIG. 1 schematically depicts the device (1), FIG. 2 schematically depicts the inserting tube (3) and FIG. 3 schematically depicts the balloon (2).

The present invention is unique and innovative also by that that the insertion of the object into the balloon is done first by inserting the objects into the inserting tube, and only after closing the opening of the inserting tube and inflating the balloon, dropping or moving the object that is inside the inserting tube into the inflated balloon, and then creating the vacuum in the balloon.

What is claimed is:

1. A method for storing objects or waste, comprising:

(a) providing an insertion tube and an inflatable balloon;
 wherein the balloon is designed to expand when air is introduced into the balloon, and further configured to inflate to a volume at least twice the balloon's uninflated size;
 wherein the insertion tube includes a sleeve and a sealing lid, the sleeve featured with an inserting opening, a drop opening, an air inlet valve, and an air outlet valve;
 wherein the lid is capable of sealing the inserting opening;
 wherein an opening of the balloon is assembled on the sleeve in a manner that positions the drop opening inside the balloon, while ensuring air only enters the balloon through the sleeve;

(b) opening the lid to allow access to the inserting opening, (c) inserting the object or waste into the sleeve through the inserting opening, (d) sealing the inserting opening by closing the lid, (e) inflating the balloon via the air inlet valve, thereby causing the object or waste to be delivered into the expanded balloon;

(f) deflating the balloon by expelling air from the balloon or withdrawing the air from the balloon using an air pump, through the air outlet valve.

2. The method of claim 1 wherein said balloon further includes a tightening band that is designed to fasten said opening of the balloon on the sleeve.

3. The method of claim 2 wherein said sleeve further includes a circumferential groove that is designed to receive said tightening band when said balloon is assembled on the sleeve.

* * * * *